(12) United States Patent
Torres et al.

(10) Patent No.: US 8,705,357 B2
(45) Date of Patent: Apr. 22, 2014

(54) METHOD AND SYSTEM FOR CONTROLLING TCP TRAFFIC WITH RANDOM EARLY DETECTION AND WINDOW SIZE ADJUSTMENTS

(75) Inventors: Robert Torres, New Market, MD (US); John Border, Adamstown, MD (US); Patrick Stevens, Mount Airy, MD (US); Jun Xu, Clarksburg, MD (US); Je-Hong Jong, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 171 days.

(21) Appl. No.: 13/306,214

(22) Filed: Nov. 29, 2011

(65) Prior Publication Data

US 2013/0136000 A1    May 30, 2013

(51) Int. Cl.
*H04L 1/00*    (2006.01)
*H04L 12/56*    (2006.01)

(52) U.S. Cl.
CPC ..................................... *H04L 47/27* (2013.01)
USPC ....................................... 370/230.1; 370/468

(58) Field of Classification Search
CPC ..... H04L 1/1832; H04L 1/187; H04L 47/225; H04L 47/27
USPC .................. 370/229–235, 428, 429, 465, 468
See application file for complete search history.

(56) References Cited

U.S. PATENT DOCUMENTS 6,092,115 A * 7/2000 Choudhury et al. .......... 709/235
6,556,578 B1   4/2003 Silberschatz et al.

FOREIGN PATENT DOCUMENTS

WO    2004/084508 A1    9/2004

OTHER PUBLICATIONS

Floyd et al., "Random Early Detection Gateways for Congestion Avoidance", IEEE/ACM Transactions on Networking, Aug. 1993, pp. 397-413, vol. 1, No. 4.
Revathi et al., "Fuzzy enabled congestion control for Differentiated Services Networks", Applied Soft Computing, May 1, 2011, pp. 5457-5462, vol. 11, No. 8.
European Search Report issued Mar. 12, 2013 for corresponding EP Appln. No. 12194913.5.

* cited by examiner

*Primary Examiner* — Pao Sinkantarakorn
(74) *Attorney, Agent, or Firm* — K&L Gates LLP

(57) ABSTRACT

A method for controlling data traffic with random early detection and window size adjustments including performing random early detection on incoming data packets, calculating a simple moving average of packet dropping probabilities for the data packets as calculated when performing random early detection, decreasing an advertised window size if the simple moving average is greater than a probability target plus a tolerance factor, increasing the advertised window size if the simple moving average is less than the probability target minus a tolerance factor, and not adjusting the window size if the simple moving average is not greater than a probability target plus a tolerance factor and not less than a probability target minus a tolerance factor.

17 Claims, 7 Drawing Sheets

METHOD AND SYSTEM FOR CONTROLLING TCP TRAFFIC WITH RANDOM EARLY DETECTION AND WINDOW SIZE ADJUSTMENTS

BACKGROUND

In communications networks, packets may be buffered on a queue before they are processed. When the incoming rate of the packets is higher than the rate at which the packets can be processed, the queue size may grow. If the packets are incoming at rate that is consistently larger than the processing rate, the queue size may grow beyond a desired length for the queue, resulting in network congestion.

One conventional approach to network traffic management may to drop packets once the queue size exceeds a certain threshold. This may be referred to as tail drop. If the dropped packets belong to a TCP flow, this may trigger TCP congestion control, forcing the TCP flow to reduce its packet sending rate significantly. This may allow the network to recover from congestion. However, when all TCP flows are triggered to slow down at the same time, i.e. global synchronization occurs, the network may suddenly be uncongested. If the queue size threshold for triggering the slow down is not sufficiently high, the processing rate may drain the queue before the TCP flows sending rates recover, which may cause the network link to be underutilized. Additionally, if the queue size threshold is too high, when the network is in equilibrium status, i.e., the incoming rate of packets is equal to the processing rate, there may be unnecessary packet delay.

Active Queue Management (AQM) may be used to address global synchronization and network underutilization by probabilistically dropping packets based on the queue size. If a packet is dropped, the TCP source may trigger congestion avoidance, for example, additive increase multiplicative decrease (AIMD), with probabilities based on different queue sizes. This may be referred to as random early detection (RED). RED may allow for fast response and autonomous rate control. However, RED may also lead to oscillation in queue size and unwanted larger packet dropping rates.

Communication networks may use Performance Enhancing Proxy (PEP) to mitigate the link-related degradations due to round trip delay, error prone environment, and time varying (non-deterministic) bandwidth. For example, in a satellite network, a PEP may be a proxy spoofer, which may be used to mitigate long latency impact due to propagation. A TCP packet may be ACKed by the proxy spoofer before arriving at its destination. When the traffic conditions on the satellite link change, the spoofer may increase or decrease an advertised TCP window size such that the TCP source can scale up or down the sending rate. A queuing delay target may be associated with the spoofed packets. When the queuing delay is higher than the target, the spoofer may reduce the advertised TCP window size; otherwise, it may increase the window size. This may be referred to as window size adjustment. Window size adjustment may not need to drop packets, but may be slow in response to the network status. In addition, oscillation in queue size may occur and the convergence to the target set point can be sensitive to the step size.

BRIEF SUMMARY

It is an object of the present invention to provide a method and system for controlling TCP traffic with random early detection and window size adjustments.

In accordance with an aspect of the present invention, a method for controlling data traffic with random early detection and window size adjustments includes performing random early detection on incoming data packets, calculating a simple moving average of packet dropping probabilities for the data packets as calculated when performing random early detection, decreasing an advertised window size if the simple moving average is greater than a probability target plus a tolerance factor, increasing the advertised window size if the simple moving average is less than the probability target minus a tolerance factor, and not adjusting the window size if the simple moving average is not greater than a probability target plus a tolerance factor and not less than a probability target minus a tolerance factor.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Figure 1:
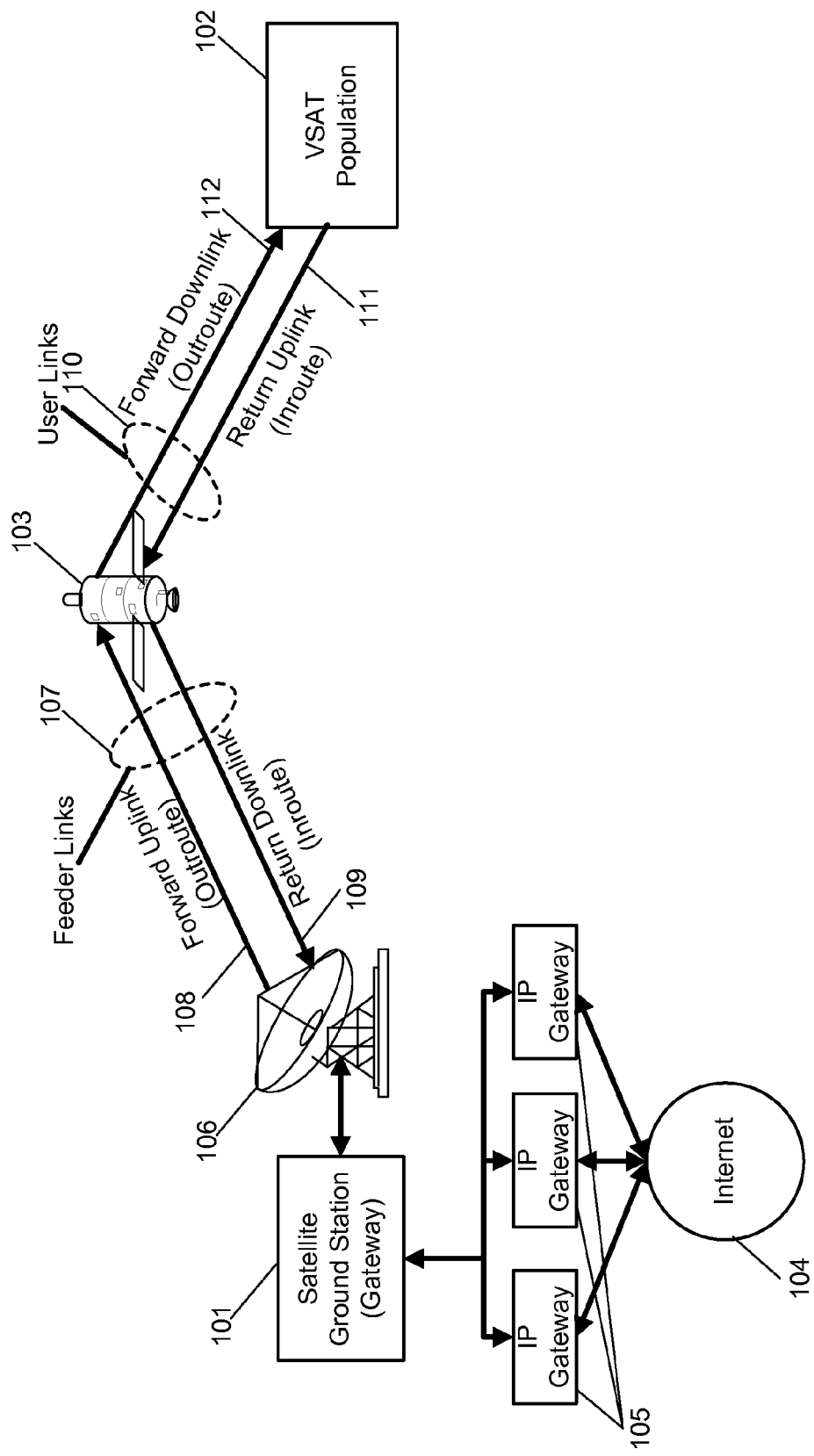
FIG. 1 depicts an exemplary satellite communications system.

Random early detection and window size adjustments may be used to control traffic on any suitable type of communications network, such as, for example, satellite communications networks, wired networks such as DSL, cable, and fiber optic networks, and wireless terrestrial networks such as 3G, 4G and WiMAX networks including cellular and WiFi equipped devices. FIG. 1 depicts an exemplary satellite communications system. The satellite communications system may include a satellite ground station, or gateway, 101, a Very Small Aperture Terminal (VSAT) population 102, a satellite 103, the Internet 104, IP gateways 105, and a RF terminal 106.

The gateway 101 may be connected to the VSATs in the VSAT population 102 through the satellite 103. Feeder links 107 may carry data between the gateway 101 and the satellite 103, and may include a forward uplink 108 for transmitting data from the gateway 101 to the satellite 103, and the return downlink 109 for transmitting data from the satellite 103 to the gateway 101. User links 110 may carry data between the satellite 103 and the VSAT population 102, and may include the return uplink 111 for transmitting data from a VSAT to the satellite 103, and a forward downlink 112 for transmitting data from the satellite 103 to a VSAT. The forward uplink 108 and the forward downlink 112 may form an outroute, and the return uplink 111 and the return downlink 109 may form an inroute. The gateway 101 may be high capacity, large antenna earth stations with connectivity to ground telecommunications infrastructure. The gateway 101 may be connected to the RF Terminal (RFT) 106. The RFT 106 may include an antenna, electronics and connectivity to allow for communications access to the satellite 103. The RFT 106 may be the physical equipment responsible for the sending and receiving of signals to and from the satellite 103, and may provide an air interface for the gateway 101.

The VSAT population 102 may include a number of VSATs or Mobile Satellite Terminals, which may be used by end users to access the satellite communications system. A VSAT may include a remote satellite dish for receiving RF signals from and transmitting RF signals to the satellite 103, a satellite modem and other equipment for managing the sending and receiving of data, and one or more remote hosts, which may be computer systems or other electronic devices capable of network communications at a site remote the gateway 101. For example, a VSAT may be used at a residence or place of business to provide access to the Internet 104.

The satellite 103 may be any suitable communications satellite for connecting the hub 101 to the remote hosts 116. For example, the satellite 103 may be a simple bent-pipe design geostationary satellite, which can accommodate innovations and variations in transmission parameters, operating in the Ka-band. The satellite 103 may use spot beams and frequency and polarization reuse to maximize the total capacity of the system. Signals passing through the satellite 103 in the forward direction, towards the VSATs, may be based on the DVB S.2 standard (ETSI EN 302 307) using signal constellations up to and including at least 16-APSK. The signals intended to pass through the satellite 103 in the return direction, toward the hubs, may be based on the IPoS standard (ETSI TS 102 354). Other suitable signal types may also be used in either direction, including, for example higher data rate variations of DVB S.2.

The gateway 101 may include the IP gateways 105. The IP gateways 105 may be the ingress portion of the local network at the gateway 101. Data from outside the gateway 101 may enter the gateway 101 through the IP gateways 105. The IP gateways 105 may include a spoofer, which may acknowledge TCP traffic sent to the gateway 101. The gateway 101 may be connected to the Internet 104 through the IP gateways 105. TCP traffic from the Internet 104 may enter the gateway 101 through the IP gateways 105. Remote terminals connected to VSATs in the VSAT population 102 may connect to the Internet 104 through the satellite 103 and the gateway 101.

Data from the Internet 104 intended for a VSAT in the VSAT population 102 may be in the form of TCP packets, although the data may also be UDP packets, SCTP packets, or any other suitable IP packets, and may enter the gateway 101 at one of the IP gateways 105, where the spoofer may send TCP acknowledgement back to the sender of the TCP packets. The TCP packets may be processed and multiplexed by the gateway 101 along with TCP packets from the other IP gateways 105, where the IP gateways 105 may or may not have the same service capabilities and relative priorities. The TCP packets may then be transmitted to the satellite 103 on the forward uplink 108 using the air interface provided by the RFT 106. The satellite 103 may then transmit the TCP packets to the VSAT using the forward downlink 112. This may be the outroute. Similarly, TCP packets may enter the ingress at a VSAT in the VSAT population 102, be processed by the VSAT 102, and transmitted to the satellite 103 via the VSAT's air interface on the return uplink 111. The satellite 103 may then send the TCP packets to the gateway 101 using the return downlink 109. This may be the inroute.

The gateway 101 and the IP gateways 105 may also be used in communications networks other than satellite communications networks, where the terminals may be devices other than VSATs, such as, for example, wireless or cellular devices.

Figure 2:
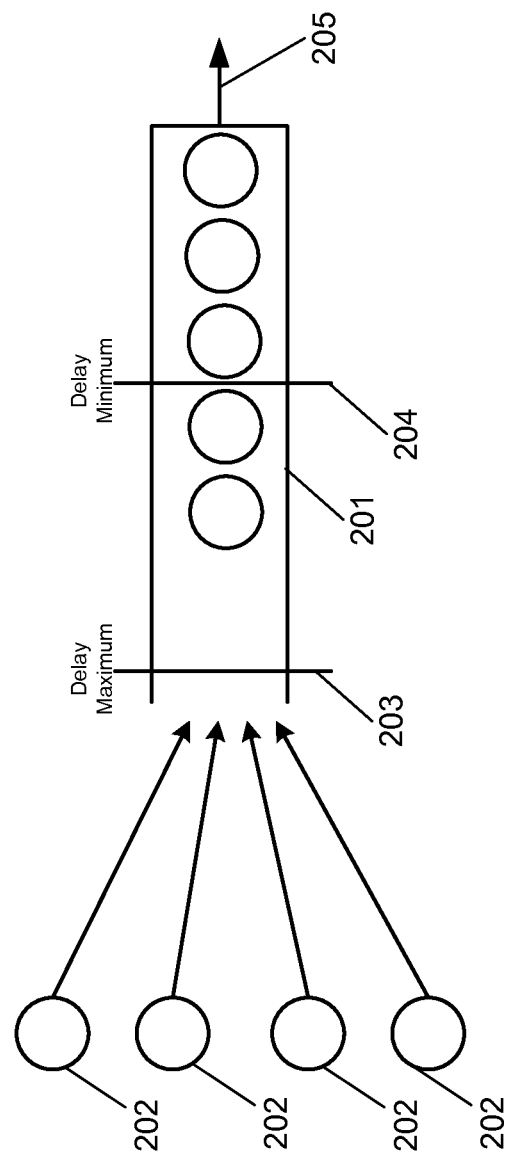
FIG. 2 depicts an exemplary virtual queue for random early detection.

FIG. 2 depicts an exemplary virtual queue for random early detection. A RED algorithm based on queuing delay may be used to manage TCP traffic flow for the satellite network or other suitable communications network using performance enhancing proxies, such as terrestrial wireless or wired networks. Queuing delay metrics may be used in applying RED because, although the queuing delay may change over time, the link capacity of the IP gateways 105, or the bandwidth assigned to a terminal, such as a VSAT, may be known at any moment due to the bandwidth allocation of the gateway 101, although the bandwidth allocation may change dynamically over short time periods. A virtual queue 201 may be used to model the overall traffic flows of packets, such as TCP packets 202, into an aggregate data flow. The TCP packets 202 may enter the IP gateways 105 from various sources, such as, for example, various web sites on the Internet 104, and may wait on queues at the IP gateways 105 before being processed and multiplexed at the gateway 101. The virtual queue 201 may represent the aggregation of queues at the IP gateways 105.

There may be delay minimum 203 and delay maximum 204 queuing latency thresholds. The delay minimum 203 may indicate the minimum amount of delay necessary before RED may drop any of the TCP packets 202 entering the virtual queue 201, and the delay maximum 204 may indicate the maximum amount of delay allowed before RED may drop all additional incoming TCP packets 202. Thus, operational packet dropping probability may be in the range between 0, associated with the delay minimum 203, and 1, associated with the delay maximum 204. The TCP packets 202 enter the queues at the IP gateways 105, which may increase the size of the virtual queue 201. The TCP packets 202 may be processed and transmitted out over an interface 205, which may be, for example, the RFT 106 in a satellite communications network as depicted in FIG. 1. As the rate at which the TCP packets 202 enter the IP gateways 105 increases, the virtual queue 201 may increase, and there may be an increase in the amount of time between when a specific TCP packet 202 enters an IP gateway 105 and when that TCP packet 202 is transmitted over the air interface 205 or other suitable external interface, such as, for example, a transmission interface for a wired network. This delay may be used by RED to determine when any of the TCP packets 202 should be dropped.

Figure 3:
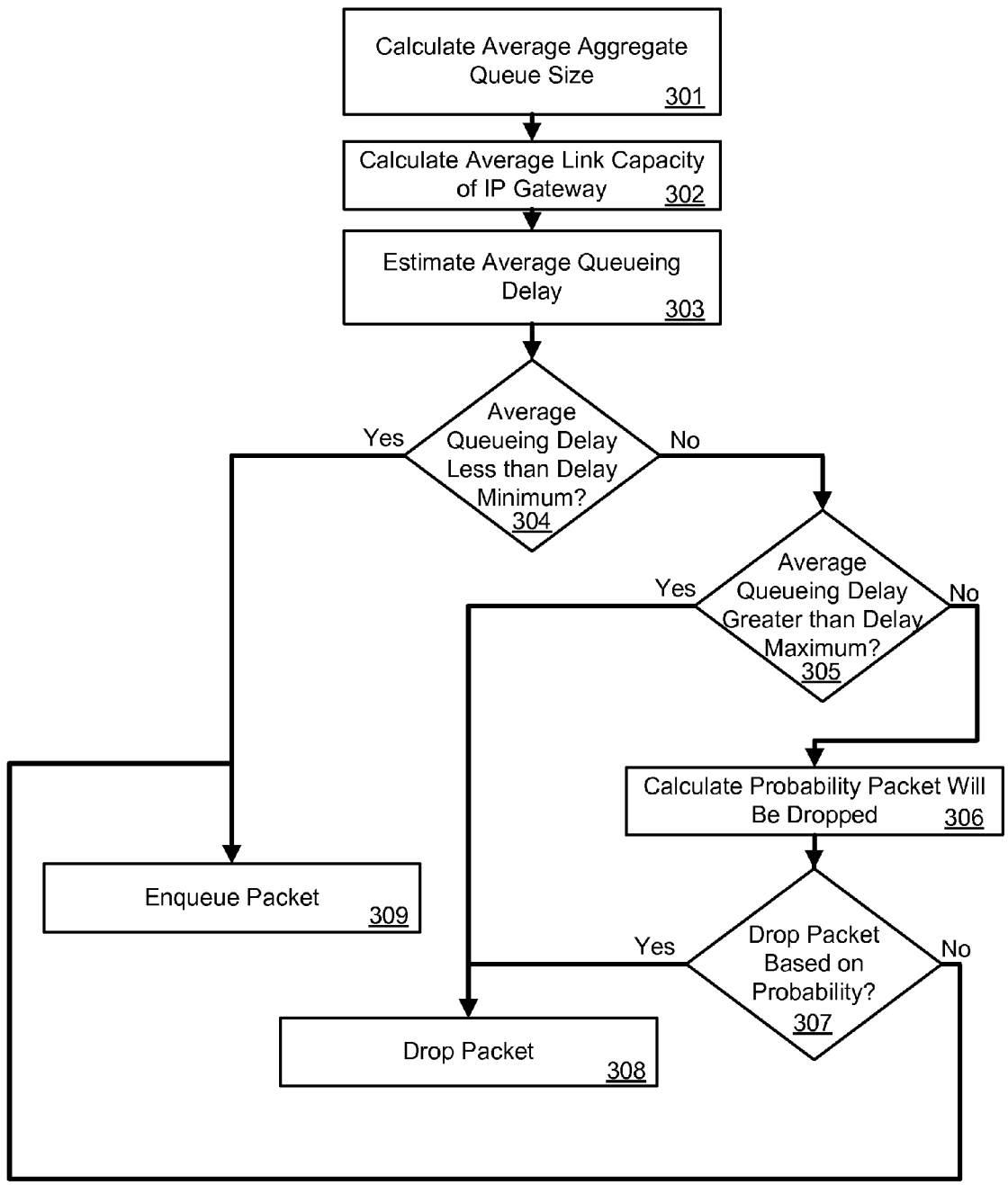
FIG. 3 depicts an exemplary procedure for random early detection.

FIG. 3 depicts an exemplary procedure for random early detection. Random early detection may be applied across multiple priorities of traffic, and may applied on the inroute or the outroute. In block 301, the average aggregate queue size may be calculated. $\hat{Q}$ may represent the average aggregate queue size of all related, such as, for example, layer 3, flows into the ingress at, for example, the IP gateways 105, including TCP and UDP flows. The time tick of scheduling clock may be denoted as t. For example, the default tick value for t may be 20 ms for the outroute scheduling interval and 45 ms for the inroute scheduling interval. At a given time t, $$\hat{Q}(t)=aQ(t)+(1-a)\hat{Q}(t-1), 0<a\leq 1 \quad (1)$$

where a may be the forgetting factor for queue size, and Q(t) may be the summation of queue sizes of each flow queried at the beginning of a scheduling period. The default value for the forgetting factor may be 0.25.

In block 302, the average link capacity of the IP gateway may be calculated. The link capacity may be the rate at which data, such as the TCP packets 202, can be processed and transmitted after entering at an ingress such as the IP gateways 105 or the ingress at a VSAT or other terminal type. $\hat{C}$ may represent the average link capacity. At a given time t, $$\hat{C}(t)=bC(t)+(1-b)\hat{C}(t-1), 0<b\leq 1 \quad (2)$$

where C(t) may be the instant offered capacity by the gateway 101 at time t and b may be the forgetting factor for link capacity. The default value for the forgetting factor may be b=0.25. At the outroute, considering traffic priorities, the offered capacity based on the granted rate for conversational and interactive traffic and the actual used capacity based on scheduling for streaming and bulk traffic may be used. For conversational and interactive traffic, C(t) may be the same as the bandwidth granted by the gateway 101. For streaming and bulk traffic, C(t) may be the most recent scheduled capacity. This may require the scheduler to maintain bookkeeping for the past data.

In block 303, the average queuing delay may be estimated. The TCP packets 202 may also belong to different priority classes, which may result in different TCP packets 202 being treated differently. The delay for each priority class may be estimated by counting the average latency of an individual TCP packet 202 from the time the TCP packet 202 enters the ingress, for example, at the IP gateways 105, to the time the TCP packet 202 is moved to the PBP queue by scheduler. This may introduce unnecessary complexity, especially when the network is not congested.

The average queuing delay, or other statistics regarding the queuing delay, may also be estimated directly using the ratio of the aggregate traffic and the allocated bandwidth. The virtual queue 201 may be drained by a certain rate based on the link capacity. Due to bandwidth allocation, the timely updated capacity may be known. The aggregate traffic amount may be obtained by calculating the amount of data, such as, for example, the TCP packets 202, in relevant queues, including spoofed or unspoofed TCP and UDP flows. $\hat{D}(t)$ may represent the average queuing delay. For each priority class, at a given time t, $$D(t)=\hat{Q}(t)/\hat{C}(t), \text{and} \quad (3)$$

$$\hat{D}(t)=\alpha D(t)+(1-\alpha)\hat{D}(t-1), 0<\alpha\leq 1, \quad (4)$$

where α may be the forgetting factor for queuing delay. The default value for the forgetting factor may be α=0.1.

In block 304, the average queuing delay may be compared to a delay minimum. For example, the average queuing delay, or other statistics regarding queuing delay, as calculated in block 303, may be compared to the delay minimum 204. D_min may be the delay minimum 204 and D_max may be the delay maximum 203. $P_{RED}$ may be the instant dropping probability for a TCP packet. If the average queuing delay is less than the delay minimum, $\hat{D}(t) \leq D\_min$ then $P_{RED}=0$, indicating the TCP packet has 0% probability of being dropped, and flow proceeds to block 309. Otherwise flow proceeds to block 305.

In block 305, the average queuing delay may be compared to the delay maximum. The For example, the average queuing delay, as calculated in block 303, may be compared to the delay maximum 203. The average queuing delay may have already been determined to be greater than the delay minimum in block 304, so if the average queuing delay is less than the delay maximum, $D\_min < \hat{D}(t) \leq D\_max$, flow proceeds to block 306. Otherwise, if the average queuing delay is greater than the delay maximum, $\hat{D}(t) > D\_max$, then $P_{RED}=1$, indicating the TCP packet has a 100% probability of being dropped, and flow proceeds to block 308.

In block 306, the probability that the TCP packet will be dropped may be calculated. The average queuing delay may be in between the delay minimum and the delay maximum, so RED may determine a probability that the TCP packet will be dropped. $P_{max}$ may be the maximum dropping probability, $0 \leq P_{max} \leq 1$. The minimum dropping probability may be $P_{mn}=0$. The probability that a TCP packet may be dropped when the average queuing delay is between the delay minimum and the delay maximum may be calculated as:

$$P_{RED}=(P_{max}-P_{min})\cdot \frac{\hat{D}(t)-D\_min}{D\_max-D\_min}. \quad (5)$$

In block 307, the probability calculated for the TCP packet may be used to determine if the packet should be dropped. Whether to drop the packet based on the probability of dropping the packet may be determined in any suitable manner, such as, for example, using a random number generator. For example, if in block 306, $P_{RED}$ may be calculated as 0.1, the TCP packet may have a 10% chance of being dropped. A random number generator may be used to generate a random number between 0 and 1. If the generated random number is greater than 0.1, the TCP packet with a $P_{RED}$ of 0.1 may be kept. Otherwise, the TCP packet may be dropped. If it is determined that the TCP packet should be dropped, flow proceeds to block 308. Otherwise flow proceeds to block 309.

In block 308, the TCP packet may be dropped. Dropping the TCP packet may result in the packet actually being dropped, or the TCP packet may be marked with an Explicit Congestion Notification. The TCP packet may be dropped either because the average queuing delay was greater than the delay maximum, meaning that all incoming TCP packets will be dropped until the average queuing delay is reduced to below the delay maximum, or because the TCP packet is being probabilistically dropped. The TCP packet may be dropped before the TCP spoofer ACKs the TCP data packet.

In block 309, the TCP packet may be enqueued. The TCP packet may be added to the queue for processing and transmission, because either the average queuing delay was less than the delay minimum, allowing all incoming TCP packets to be enqueued, or the TCP packet was not probabilistically dropped.

The procedure for random early detection may run for each incoming TCP packet. Block 301, 302, and 303 may be repeated for each incoming TCP packet, or may be run at set intervals while blocks 304 through 309 run for each incoming TCP packet using the most recently calculated values from blocks 301, 302 and 303.

Figure 4:
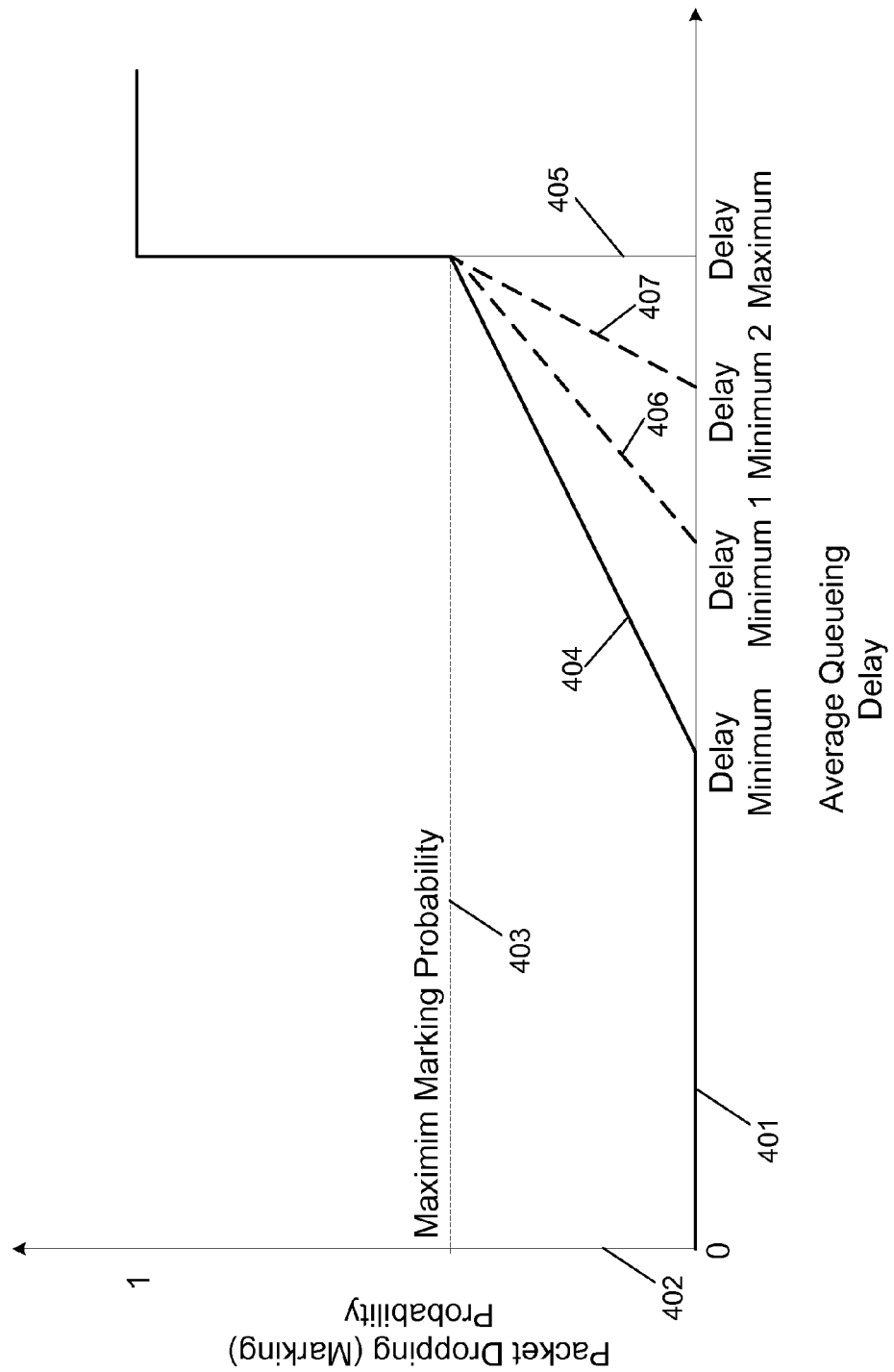
FIG. 4 depicts an exemplary graph representation of random early detection.

FIG. 4 depicts an exemplary graph representation of random early detection. X-axis 401 may represent the average queuing delay. Y-axis 402 may represent the probability of packet being dropped, and may have a minimum of 0 and a maximum of 1, representing 0% and 100% probabilities, respectively. Maximum marking probability 403 may represent $P_{max}$, the maximum probability that a TCP packet may be dropped when the average queuing delay is not greater than the delay maximum. Delay minimum 404 and delay maximum 405 may represent the maximum and minimum queuing delays, D_min and D_max. As average queuing delay increases, the graph shows that the probability of a TCP packet being marked for dropping may stay at 0 until the average queuing delay reaches the delay minimum 404. Increases in the average queuing delay after the delay minimum 404 has been reached may result in an increase in the probability of a TCP packet being dropped. When the average queuing delay is equal to the delay maximum 405, the probability of a TCP packet being dropped may be equal to the maximum marking probability 403. If the average queuing delay increases to become greater than the delay maximum 405, the probability of a TCP packet being dropped may becomes 1, or 100%.

RED may use various delay thresholds, which may be set to support multiple rate plans or priorities. Different RED probabilities may be applied to different traffic classes in terms of throughput requirement, or rate plan. For example, in one rate plan, such as a base plan with lower throughput, probabilistic back-off may be triggered at the delay minimum 404, as described above. Another rate plan, such as a high rate plan, may not back-off until the average queuing delay exceeds a delay minimum 2 407. As depicted in FIG. 4, TCP packets being sent using the higher rate plan won't start being dropped until after the average queuing delay is greater than the delay minimum 2 407, which occurs after the average queuing delay is greater than the delay minimum 404. Thus, TCP packets sent on the lower rate plan will be dropped first, and TCP packets on the higher rate plan will only be dropped if the average queuing delay continues to increase anyway. A terminal, such as a VSAT, using the higher plan rate may have higher average sending rate than the one with lower plan rate at equilibrium status. There may also be an intermediate rate plan with a delay minimum 1 406.

At the outroute, different thresholds may be applied to multiple service plans for each priority. The exemplary thresholds, the delay minimum 404, the delay minimum 1 406, and the delay minimum 2 407, may be used for base and higher rate plans, respectively. These parameters may be configurable. At the inroute, since a single terminal, or VSAT, may be tied to a service plan, the thresholds may be employed to support multiple traffic priorities. Higher priority traffic may have a larger delay minimum value.

Figure 5:
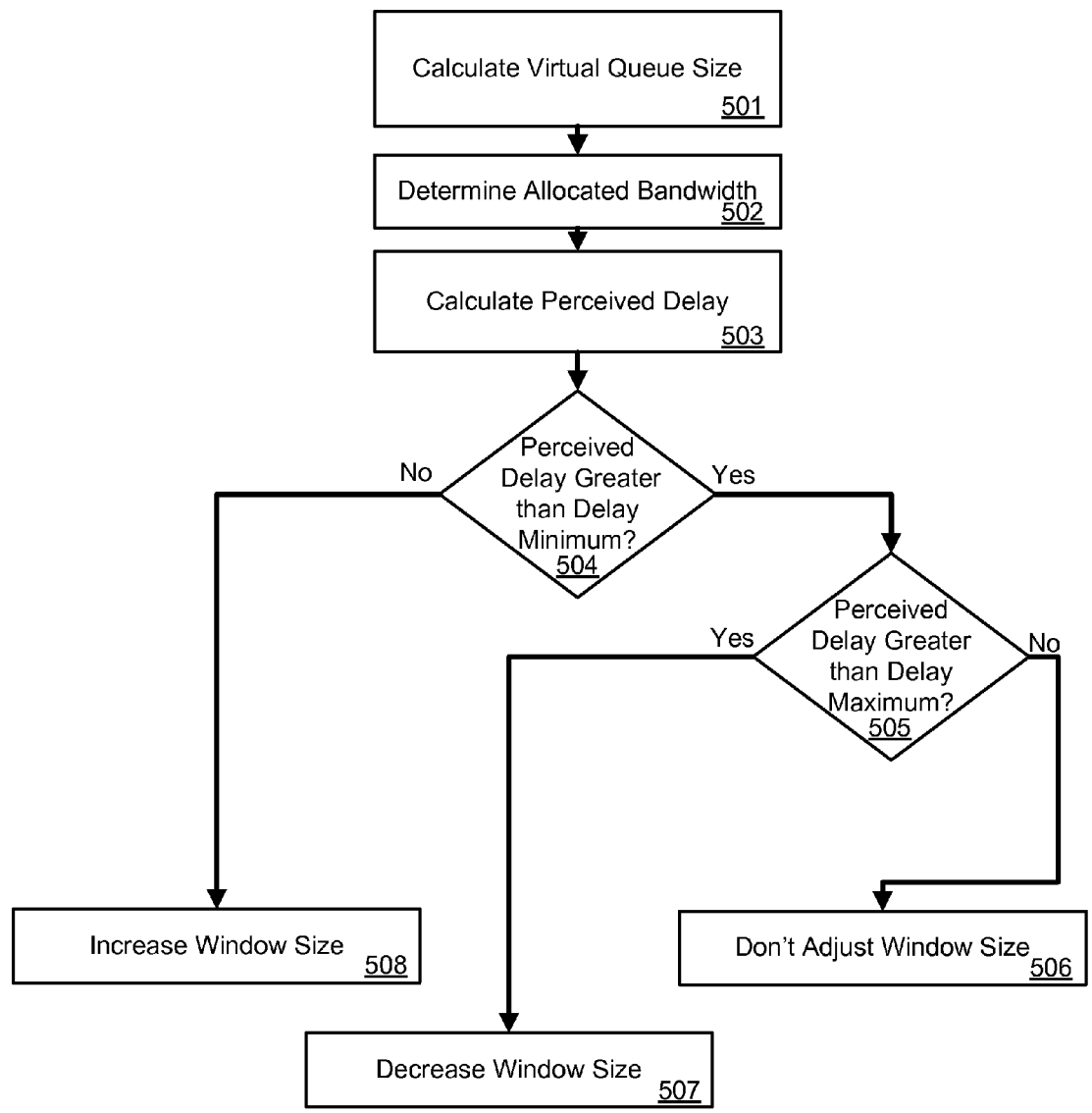
FIG. 5 depicts an exemplary procedure for window size adjustment.

FIG. 5 depicts an exemplary procedure for window size adjustment. Window size adjustment may be applied at the inroute or the outroute. TCP sources, such as, for example, the sources of the TCP packets 202, may receive a TCP ACK message from their receivers. The TCP ACK message may contain the maximum window size of the receiver. The TCP sources may use this message to limit their sending rate to the assigned maximum window size. By adjusting the maximum window size, traffic flow may be controlled. For example, in a satellite communications network, sources on the Internet 104 may send the TCP packets 202 to the IP Gateways 105, and the TCP packets may be intended for a VSAT in the VSAT population 102. The IP gateways 105 may use a spoofer to act as the receiver of the TCP packets 202, and may send TCP ACK messages including maximum window sizes to the sources on the Internet 104, causing the sources to adjust the rate at which the TCP packets 202 are sent.

Congestion may occur when the aggregate traffic rate of incoming traffic, for example the TCP packets 202, is consistently larger than the rate at which the traffic can be process, over a given amount of time. $\lambda$ may represent the aggregate, or average, traffic rate, and $\mu$ may represent the processing rate associated with a queue, such as the virtual queue 201. When $\lambda > \mu$, the amount of data, such as the TCP packets 202, waiting on the queue may increase; when $\lambda < \mu$, the amount of data waiting on the queue may decrease. When $\lambda = \mu$, the queue may be in an equilibrium state. Window size adjustment may be used to adjust the rate of traffic entering an ingress, such as the IP gateways 105, in order to alleviate congestion.

A receiver may have N TCP connections, and each TCP connection may have a coefficient $\alpha_i$ related to roundtrip delay. The maximum window size $W_{max}$ may be the same for all TCP connections. N and $\alpha_i$ may both be random variables, and long term averaging may be needed to obtain a good average. $\mu$ may be known and constant. $Q_{tar}$ may be the desired, or target, queue size. At time t, the queue size may be Q(t). At time t+1:

$$Q(t+1) = \int_t^{t+\Delta T}\left(\sum_{i=1}^N \alpha_i W_{max}(t) - \mu\right)dt + Q(t). \quad (6)$$

The resultant queue size may be compared with the target queue size, and the difference $\Delta Q$ may be calculated according to $$\Delta Q = Q(t+1) - Q_{tar} \quad (7)$$

$$= \int_t^{t+\Delta T}\left(\sum_{i=1}^N \alpha_i W_{max}(t) - \mu\right)dt + Q(t) - Q_{tar}$$

If $\Delta Q = 0$, then equilibrium may have been reached, resulting in $$\sum_{i=1}^N \alpha_i W_{max}(t) = \mu\left(1 + \frac{Q_{tar} - Q(t)}{\mu}\frac{1}{\Delta T}\right), \text{ and} \quad (8)$$

$$W_{max}(t) = \frac{\mu}{\sum_{i=1}^N \alpha_i}\left(1 + \frac{\Delta D}{\Delta T}\right), \text{ and} \quad (9)$$

$$\Delta D = \frac{Q_{tar} - Q(t)}{\mu}. \quad (10)$$

Letting $W_{max}(t_0) = \frac{\mu}{\sum_{i=1}^N \alpha_i} a\mu$, where $a = \frac{1}{\sum_{i=1}^N \alpha_i}$ at time $t_0$, may result in a recursive expression for relative window size adjustment based on the delay difference, at time $t_0+n$:

$$W_{max}(t_0+n) = W_{max}(t_0+n-1)(1+\beta\cdot\Delta D), 0<\beta<1, \quad (11)$$

or $$W_{max}(t_0+n) = W_{max}(t_0+n-1)+\Delta W, 0<\beta<1. \quad (12)$$

To validate the above equation, it may be shown that $$W_{max}(t_0+n) \cong W_{max}(t_0)(1+n\cdot\beta\cdot\Delta D) = a\mu\left(1+\frac{\Delta D}{\Delta T}\right). \quad (13)$$

Thus, given a certain relative step size, after a few iterations, the window size may be adjusted to satisfy the delay requirement.

In block 501, the size of a virtual queue may be calculated. To determine if the congestion exists, the current size of the virtual queue may need to be known. The size of the virtual queue at time t, Q(t), may be calculated as in RED, as the summation of queue sizes of each flow queried at the beginning of a scheduling period.

In block 502, the bandwidth allocated to the virtual queue may be determined. The allocated bandwidth may determine the rate at which data, such as the TCP packets 202, are processed and transmitted from the virtual queue 201. The allocated bandwidth at time t, R(t), may be determined based on data received from, for example, the gateway 101, granting bandwidth to the IP gateways 105.

In block 503, the perceived delay may be calculated. The perceived delay may be the perceived amount of time data, such as one of the TCP packets 202, must wait to leave the virtual queue 201 after entering the virtual queue 201. Perceived delay at time t, D(t), may be calculated as $$D(t) = \frac{\text{Virtual Queue Size}}{\text{Allocated Bandwidth}} = \frac{Q(t)}{R(t)} \qquad (14)$$

In block 504, the perceived delay may be compared to a delay minimum. The delay minimum, $D_{min}$, may be, for example, the delay minimum 204. If the perceived delay is not greater than the delay minimum, $D(t) \leq D_{min}$, there may be no congestion, and flow proceeds to block 508. Otherwise, flow proceeds to block 505.

In block 505, the perceived delay may be compared to a delay maximum. The delay maximum, $D_{max}$, may be, for example, the delay maximum 203. If the perceived delay is greater than the delay maximum, $D(t) > D_{max}$, there may be congestion, and flow proceeds to block 506. Otherwise, flow proceeds to block 506.

In block 506, the window size may not be adjusted. The perceived delay may be greater than the delay minimum, but not greater than the delay maximum, $D_{min} < D(t) \leq D_{max}$. The window size may be left the same, $W_{max}(t+1) = W_{max}(t)$, as the network may not be either congested to the point where the TCP sources need to slow down their sending rate, nor uncongested to the point where the TCP sources can increase their sending rate.

In block 507, the window size may be decreased. When the perceived delay is greater than the delay maximum, there may be congestion. To alleviate the congestion, the receiver, for example, the IP gateways 105, may decrease the window size advertised to the sources of the TCP packets 202, which may decrease the sending rate of those sources. The window size may be decreased according to $W_{max}(t+1) = W_{max}(t) - \Delta W$.

In block 508, the window size may be increased. When the perceived delay is shorter than the delay minimum, the network may be underutilized. To better utilize the available network capacity, the receiver, for example, the IP gateways 105, may increase the window size advertised to the sources of the TCP packets, which may increase the sending rate of those sources. The window size may be increased according to $W_{max}(t+1) = W_{max}(t) + \Delta W$.

RED, as described in FIG. 3, may be leveraged using window size adjustment, as described in FIG. 5. The combination of RED and window size adjustment may result in faster responses to congestion, and improved stability, and may be applied at the inroute or the outroute.

Figure 6:
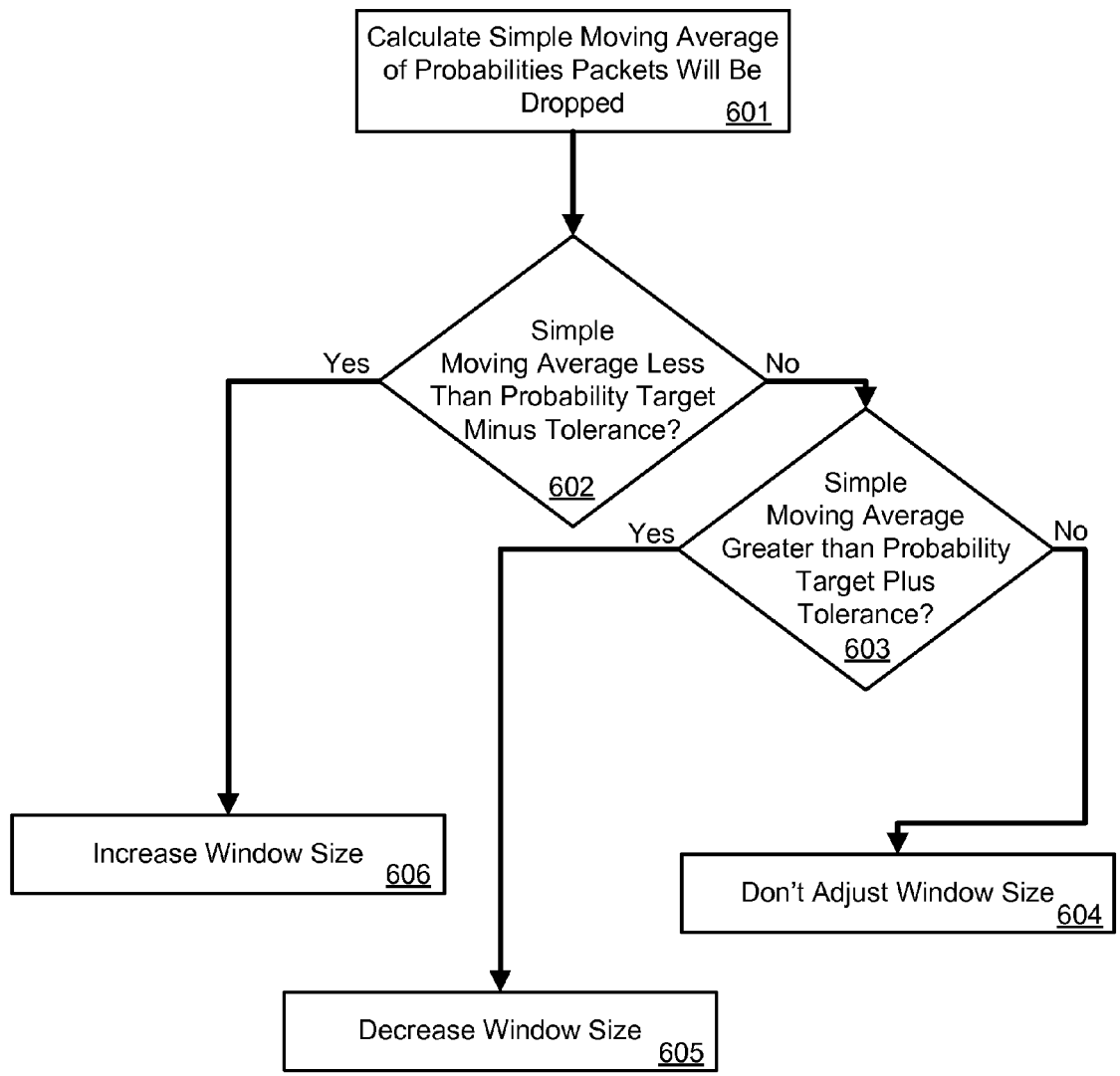
FIG. 6 depicts an exemplary procedure for window size adjustment used with random early detection.

FIG. 6 depicts an exemplary procedure for window size adjustment used with random early detection. RED, as described in FIG. 3, may run in conjunction with window size adjustment, and may be used for traffic management on any suitable communications network using performance enhancing proxies, such as terrestrial wireless or wired networks. The procedure for window size adjustment may be modified to use the packet dropping probabilities computed by RED in place of perceived delay, and a target probability range in place of the delay minimum and the delay maximum. In block 601, the simple moving average of probabilities that a packet will be dropped may be calculated. The simple moving average, $P_{RED,SMA}$, may be the simple average over a time period of probabilities for packet dropping as calculated by the RED procedure, for example, as in blocks 304, 305, and 306. The simple moving average may calculated as:

$$P_{RED,SMA} = \frac{\sum_{t0=1}^{K} P_{RED}(t-t0+1)}{K}$$

where K may be the number of samples to use for the simple moving average. For example, the average updating period for $P_{RED}$ may be 20 milliseconds. The default averaging period for $P_{RED,SMA}$ may be 200 samples.

In block 602, the simple moving average may be compared to a probability target minus a tolerance factor. The probability target, $P_{th}$, may be a desired packet dropping probability across all incoming data. $P_{th}$ may be selected such that, when $P_{RED,SMA} = P_{th}$, the system is at equilibrium and is neither congested nor underutilized, and packets experience a targeted delay amount. $P_{th}$ may be modified with a tolerance factor, $\delta$, so that the system may be considered to be at equilibrium if $P_{RED,SMA}$ is within $[P_{th}-\delta, P_{th}+\delta]$. If the simple moving average is less than probability target minus the tolerance factor, $P_{RED,SMA} < P_{th}-\delta$, flow proceeds to block 606. Otherwise, flow proceeds to block 603.

In block 603, the simple moving average may be compared to the probability target plus the tolerance factor. If the simple moving average is greater than the probability target plus the tolerance factor, $P_{RED,SMA} > P_{th}+\delta$, flow proceeds to block 605. Otherwise, flow proceeds to block 604.

In block 604, the window size may not be adjusted. The simple moving average may be within the range of the target probability plus or minus the tolerance factor, $P_{th}-\delta \leq P_{RED,SMA} \leq P_{th}+\delta$. The system may be at equilibrium, so there may be no need to adjust the window size. As in block 506, the window may remain the same size, $W_{max}(n+1) = W_{max}(n)$, where n is the window adjustment interval.

In block 605, the window size may be decreased. When the simple moving average is greater than the probability target plus the tolerance factor, there may be congestion, as packets have a higher probability of being dropped than is desired according to the probability target. To alleviate the congestion and reduce the probability of packets being dropped, the receiver, for example, the IP gateways 105, may decrease the window size advertised to the sources of the TCP packets 202, which may decrease the sending rate of those sources. The window size may be decreased according to $W_{max}(n+1) = W_{max}(n) - \Delta W$. Reducing the window size may reduce the amount of incoming data, which may in turn reduce the probability at which RED drops packets, helping move the simple moving average closer to the probability target.

In block 606, the window size may be increased. When the simple moving average is less than the probability target minus the tolerance factor, the network may be underutilized. To better utilize the available network capacity, the receiver, for example, the IP gateways 105, may increase the window size advertised to the sources of the TCP packets, which may increase the sending rate of those sources. The window size may be increased according to $W_{max}(n+1) = W_{max}(n) + \Delta W$. Increasing the window size may increase the amount of incoming data, which may in turn increase the probability at which RED drops packets, helping moving the simple moving average closer to the probability target.

The default parameters for using RED with window size adjustment may be: $\Delta W$ may be one packet (1000~1500 bytes), the desired RED probability $P_{th}$ may be around 0.5% (or 1%), the tolerance factor $\delta$ may be 0.2%, and the window size updating interval n may range from 100 ms to 1000 ms, and may be 400 ms by default.

Figure 7:
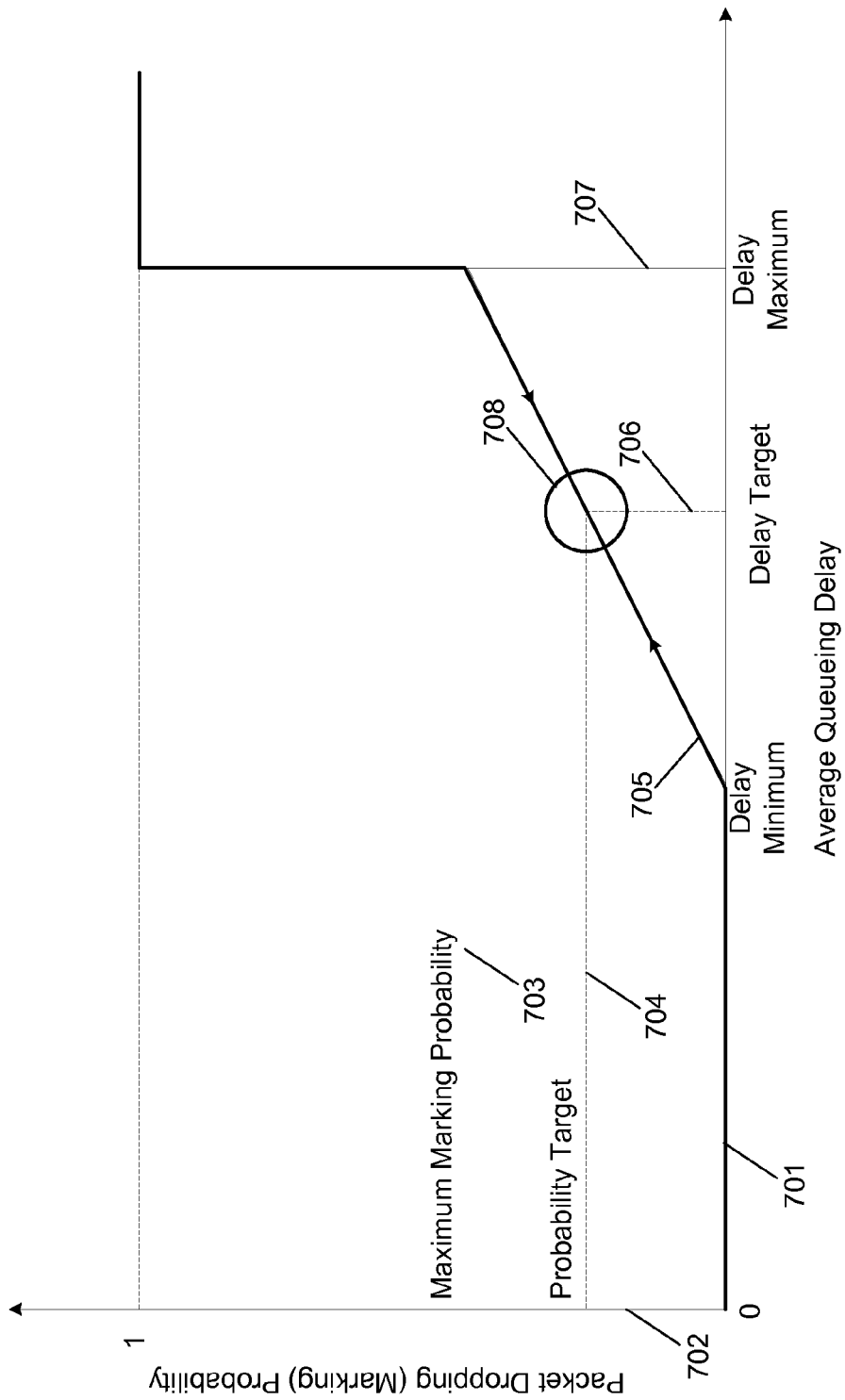
FIG. 7 depicts an exemplary graph representation of window size adjustment used with random early detection.

FIG. 7 depicts an exemplary graph representation of window size adjustment used with random early detection. X-axis 701 may represent the average queuing delay. Y-axis 702 may the probability of the packet being dropped, and may have a minimum of 0 and a maximum of 1, representing 0% and 100% probabilities, respectively. Maximum marking probability 703 may represent $P_{max}$, the maximum probability that a TCP packet may be dropped when the average queuing delay is not greater than the delay maximum. Probability target 704 may represent the desired RED packet dropping probability $P_{th}$. Delay minimum 705 and delay maximum 707 may represent the maximum and minimum queuing delays, D_min and D_max. Delay target 706 may represent the target delay for queued packets, which may be the delay experienced by the average packet when RED is operating at the probability target 704. The target area 708, $[P_{th}-\delta, P_{th}+\delta]$, may be an area defined by the probability target 704 and the tolerance factor, such that when $P_{RED,SMA}$ is within the target area, it may be considered to be close enough to the probability target 704 that the window size does not need adjusting. As average queuing delay increases, the graph shows that the probability of a TCP packet being marked for dropping may stay at 0 until the average queuing delay reaches the delay minimum 404. Increases in the average queuing delay after the delay minimum 705 has been reached may result in an increase in the probability of a TCP packet being dropped. The window size may be increased, resulting in further increases in average queuing delay, moving $P_{RED,SMA}$ closer to target area 708. If the average queuing delay increases such that $P_{RED,SMA}$ becomes greater than the probability target 704, and is outside the target area 708, the window size may be decreased, resulting in reductions in average queuing delay and moving $P_{RED,SMA}$ back towards the target area 708. When the average queuing delay is equal to the delay maximum 707, the probability of a TCP packet being dropped may be equal to the maximum marking probability 703. If the average queuing delay increases to become greater than the delay maximum 707, the probability of a TCP packet being dropped may becomes 1, or 100%.

If there are multiple service plans or priorities, the TCP window adjustment may be driven by the base function, which may be associated with the base service plan for the outroute, and the lowest priority for the inroute terminal.

Some terminals may not behave properly with a large number of flows with high incoming data rate. While the scheduler may limit the assigned resource for such terminals, the accumulated data at the IP gateways 105 may trigger RED, impacting other regular terminals. To avoid this, the overall queue size for one single terminal may be limited so that the stored data remains at a reasonable level. For example, the memory size for a terminal may be large enough to hold one to two seconds worth of data for each priority class.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A method for controlling data traffic with random early detection and window size adjustments comprising:
  performing random early detection on incoming data packets;
  calculating a simple moving average of packet dropping probabilities for the data packets;
  decreasing an advertised window size if the simple moving average is greater than a probability target plus a tolerance factor;
  increasing the advertised window size if the simple moving average is less than the probability target minus a tolerance factor; and
  not adjusting the window size if the simple moving average is not greater than a probability target plus a tolerance factor and not less than a probability target minus a tolerance factor.

2. The method of claim 1, wherein performing random early detection on incoming data packets comprises:
  calculating an average aggregate queue size;
  calculating an average link capacity;
  estimating an average queuing delay using the average aggregate queue size and the average link capacity;
  enqueuing an incoming data packet and setting the packet dropping probability for the incoming data packet to 1 if the average queuing delay is less than a delay minimum;
  dropping the incoming data packet and setting the packet dropping probability for the incoming data packet to 0 if the average queuing delay is greater than a delay maximum; and
  calculating the packet dropping probability for the packet if the average queuing delay is not less than the delay minimum and not greater than the delay maximum and using the packet dropping probability to determine if the packet should be dropped.

3. The method of claim 2, wherein the average aggregate queue size is calculated according to:

$$Q(t) = aQ(t) + (1-a)\hat{Q}(t-1)$$

wherein $Q(t)$ is the summation of queue size of each flow queried at the beginning of a scheduling period, a is a forgetting factor wherein $0 < a \le 1$, $\hat{Q}(t)$ is the average aggregate queue size, and t is a time tick of a scheduling clock.

4. The method of claim 2, wherein the average link capacity is calculated according to:

$$\hat{C}(t) = bC(t) + (1-b)\hat{C}(t-1)$$

wherein $C(t)$ is the instant offered capacity at time t, t is a time tick of a scheduling clock, b is a forgetting factor wherein $0 < b \le 1$, and $\hat{C}(t)$ is the average link capacity.

5. The method of claim 2, wherein the average queuing delay is calculated according to:

$$\hat{D}(t) = \alpha D(t) + (1-\alpha)\hat{D}(t-1)$$

wherein $D(t) = \hat{Q}(t)\hat{C}(t)$, $\hat{C}(t)$ is the average link capacity, $\hat{Q}(t)$ is the average aggregate queue size, t is a time tick of a scheduling clock, and $\alpha$ is a forgetting factor wherein $0 < \alpha \le 1$.

6. The method of claim 2, where the packet dropping probability of the incoming data packet when the average queuing delay is not less than the delay minimum and not greater than the delay maximum is calculated according to $$P_{RED} = (P_{max} - P_{min}) \cdot \frac{\hat{D}(t) - \text{D\_min}}{\text{D\_max} - \text{D\_min}}$$

wherein $P_{max}$ is the maximum dropping probability wherein $0 \le P_{max} \le 1$, $P_{min}$ is the minimum packet dropping probability, D_min is the delay minimum, D_max is the delay maximum, $\hat{D}(t)$ is the average queuing delay, t is a time tick of a scheduling clock, and $P_{RED}$ is the packet dropping probability.

7. The method of claim 1, wherein the simple moving average is calculated according to:

$$P_{RED,SMA} = \frac{\sum_{t0=1}^{K} P_{RED}(t - t0 + 1)}{K}$$

wherein K is the number of samples used for the simple moving average, $P_{RED}$ is the packet dropping probability for an incoming data packet, t is a time tick of a scheduling clock, and $P_{RED,SMA}$ is the simple moving average.

8. The method of claim 1, wherein the incoming data packets are TCP packets.

9. A system for controlling data traffic with random early detection and window size adjustments comprising:
  an IP gateway connected to a gateway;
  wherein the IP gateway is configured to receive incoming data packets from packet sources,
  perform random early detection on the incoming data packets,
  calculate a simple moving average of packet dropping probabilities for the incoming data packets, wherein the packet dropping probabilities are calculated by the IP gateway performing random early detection,
  decrease a size of a window advertised to the packet sources if the simple moving average is greater than a probability target plus a tolerance factor,
  increase the size of the window advertised to the packet sources if the simple moving average is less than the probability target minus a tolerance factor, and
  not adjust the size of the window if the simple moving average is not greater than a probability target plus a tolerance factor and not less than a probability target minus a tolerance factor.

10. The system of claim 9, wherein the IP gateway is configured to perform random early detection on the incoming data packets by
  calculating an average aggregate queue size at the IP gateway;
  calculating an average link capacity of the IP gateway;
  estimating an average queuing delay using the average aggregate queue size and the average link capacity;
  enqueuing an incoming data packet to be transmitted and setting the packet dropping probability for the incoming data packet to 1 if the average queuing delay is less than a delay minimum;
  dropping the incoming data packet and setting the packet dropping probability for the incoming data packet to 0 if the average queuing delay is greater than a delay maximum; and
  calculating the packet dropping probability for the packet if the average queuing delay is not less than the delay minimum and not greater than the delay maximum and using the packet dropping probability to determine if the packet should be dropped.

11. The system of claim 10, wherein the average aggregate queue size is calculated according to:

$$\hat{Q}(t)=aQ(t)+(1-a)\hat{Q}(t-1)$$

wherein Q(t) is the summation of queue size of each flow queried at the beginning of a scheduling period, a is a forgetting factor wherein $0<a\leq 1$, $\hat{Q}(t)$ is the average aggregate queue size, and t is a time tick of a scheduling clock.

12. The system of claim 10, wherein the average link capacity is calculated according to:

$$\hat{C}(t)=bC(t)+(1-b)\hat{C}(t-1)$$

wherein C(t) is the instant offered capacity at time t, t is a time tick of a scheduling clock, b is a forgetting factor wherein $0<b\leq 1$, and $\hat{C}(t)$ is the average link capacity.

13. The system of claim 10, wherein the average queuing delay is calculated according to:

$$\hat{D}(t)=\alpha D(t)+(1-\alpha)\hat{D}(t-1)$$

wherein $D(t)=\hat{Q}(t)\hat{C}(t)$, $\hat{C}(t)$ is the average link capacity, $\hat{Q}(t)$ is the average aggregate queue size, t is a time tick of a scheduling clock, and α is a forgetting factor wherein $0<\alpha\leq 1$.

14. The system of claim 10, where the packet dropping probability of the incoming data packet when the average queuing delay is not less than the delay minimum and not greater than the delay maximum is calculated according to $$P_{RED} = (P_{max} - P_{min}) \cdot \frac{\hat{D}(t) - D\_min}{D\_max - D\_min}$$

wherein $P_{max}$ is the maximum dropping probability wherein $0\leq P_{max}\leq 1$, $P_{min}$ is the minimum packet dropping probability, D_min is the delay minimum, D_max is the delay maximum, $\hat{D}(t)$ is the average queuing delay, t is a time tick of a scheduling clock, and $P_{RED}$ is the packet dropping probability.

15. The system of claim 9, wherein the simple moving average is calculated according to:

$$P_{RED,SMA} = \frac{\sum_{t0=1}^{K} P_{RED}(t-t0+1)}{K}$$

wherein K is the number of samples used for the simple moving average, $P_{RED}$ is the packet dropping probability for an incoming data packet, t is a time tick of a scheduling clock, and $P_{RED,SMA}$ is the simple moving average.

16. The system of claim 9, wherein the incoming data packets are TCP packets.

17. A system for controlling data traffic with random early detection and window size adjustments comprising:
a terminal;
wherein the terminal is configured to receive incoming data packets from packet sources,
perform random early detection on the incoming data packets,
calculate a simple moving average of packet dropping probabilities for the incoming data packets, wherein the packet dropping probabilities are calculated by an IP gateway performing random early detection,
decrease a size of a window advertised to the packet sources if the simple moving average is greater than a probability target plus a tolerance factor,
increase the size of the window advertised to the packet sources if the simple moving average is less than the probability target minus a tolerance factor, and
not adjust the size of the window if the simple moving average is not greater than a probability target plus a tolerance factor and not less than a probability target minus a tolerance factor.

* * * * *